United States Patent
Staal

[11] 3,813,511
[45] May 28, 1974

[54] METHOD OF AND APPARATUS FOR ABSORBING HIGH POWER LASER ENERGY

[75] Inventor: John V. Staal, Needham, Mass.

[73] Assignee: AVCO Everett Research Laboratory Inc., Everett, Mass.

[22] Filed: Feb. 21, 1973

[21] Appl. No.: 334,402

[52] U.S. Cl............................ 219/121 LM, 165/104
[51] Int. Cl............................................. B23k 27/00
[58] Field of Search... 219/121 L, 121 LM, 121 EB, 219/121 EM, 160, 302; 331/94.5 A; 250/338, 342, 419; 165/147

[56] References Cited
UNITED STATES PATENTS
3,304,933   2/1967   Bates ............................ 219/302 X Primary Examiner—J. V. Truhe
Assistant Examiner—Clifford C. Shaw
Attorney, Agent, or Firm—Charles M. Hogan, Esq.; Melvin E. Frederick, Esq.

[57] ABSTRACT

A method of and apparatus for receiving and absorbing high power laser energy comprising a bed of comminuted material having a high melting point, such as sand or comminuted granular refractory material that will function as an inert diffuse scatterer of an incident laser beam, and laser beam mirror means for directing a preferably defocused laser beam onto the bed of comminuted material. Where it does not inherently or otherwise exist, the laser beam is defocused to the extent that the intensity of the beam (power/unit area) leaving the mirror means and impinging on the bed of material is sufficiently low as to not sufficiently change the surface characteristic of the bed of material away from being an inert diffuse scatterer of the laser beam incident on it.

12 Claims, 2 Drawing Figures

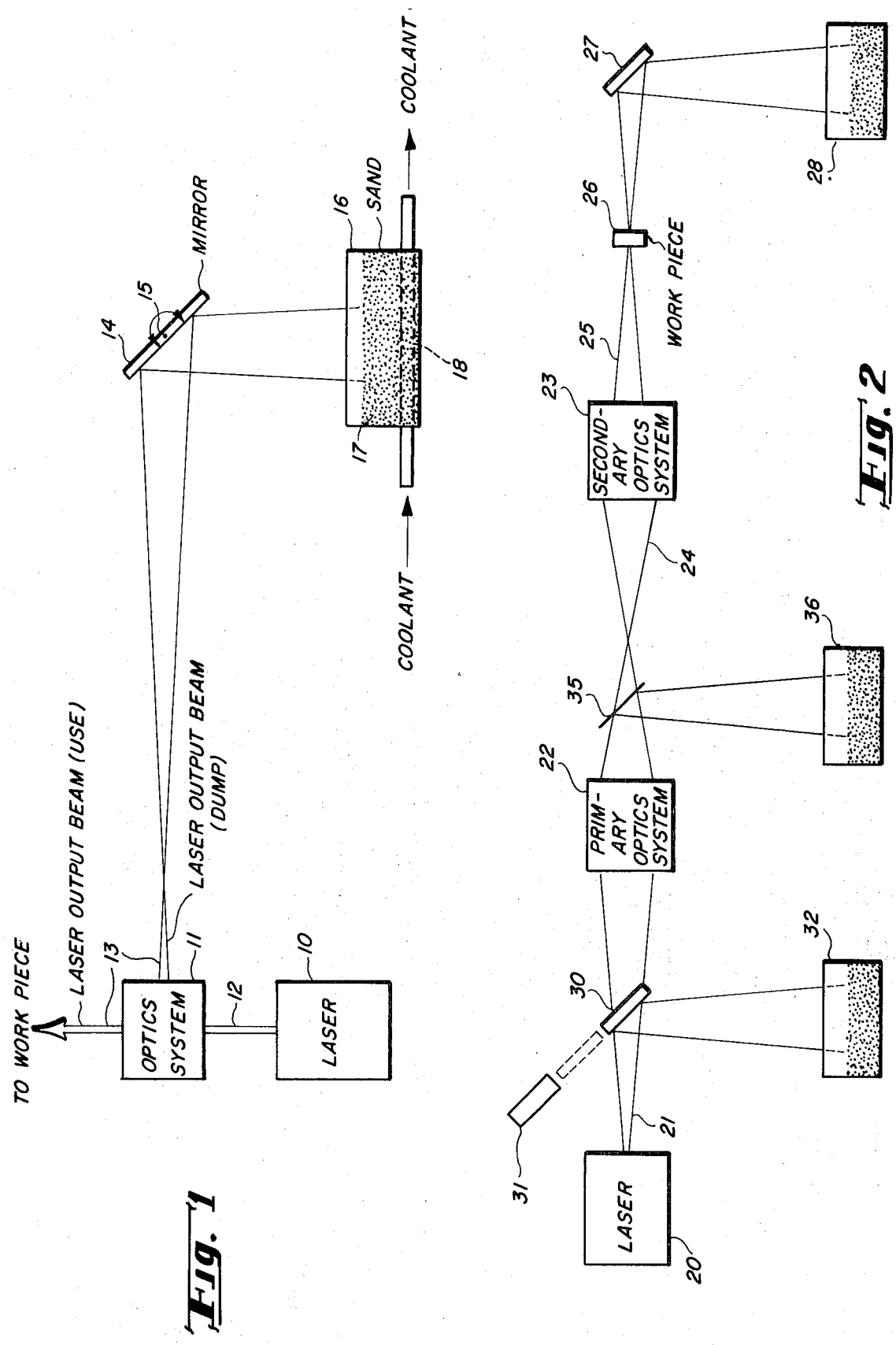

METHOD OF AND APPARATUS FOR ABSORBING HIGH POWER LASER ENERGY

The present invention relates to absorption of radiant energy and more particularly to absorption of high power laser energy.

It is an object of the present invention to provide a method of and apparatus for absorbing high power laser beams.

Another object of the present invention is to provide method of and apparatus for receiving and converting all or part of high power laser energy in a laser beam to non-coherent Black Body radiation.

A further object of the invention is to provide a method of and apparatus for safely, conveniently, and selectively permitting the intermittent use of a cw high power laser beam by safely and conveniently converting the laser beam to non-coherent Black Body radiation when it is not desired to use the laser beam.

The novel features that are considered characteristic of the invention are set forth in the appended claims; the invention itself, however, both as to its organization and method of operation, together with additional objects and advantages thereof will best be understood from the following description of a specific embodiment, when read in conjunction with the accompanying drawing wherein:

FIG. 1 is a schematic view of laser apparatus embodying the present invention; and FIG. 2 is a schematic view of a laser system incorporating several different applications for absorbing high power laser energy in accordance with the invention.

Referring now to FIG. 1, there is shown apparatus embodying the present invention comprising a laser source 10 capable of producing a typically high energy laser beam. The laser source 10 is positioned and/or combined with an optical system 11 which receives the laser beam 12 from the laser source 10 and directs it in the desired configuration and/or in one or more directions. One typical laser of the gas dynamic type is described in Patent application Ser. No. 80,152 filed Oct. 12, 1970, now U.S. Pat. No. 3,317,030, assigned to the same assignee as this application. Another suitable laser of the electrically excited type is described in U.S. Pat. No. 3,702,973.

Such lasers as referred to above are typically capable of producing laser beams having sufficient power (20 kilowatts and above, continuous power) to heat treat, cut or weld substantial thicknesses of steel. The optical system 11 may comprise in well-known manner conventional optics (not shown) to provide focusing, shaping, directional control and the like as circumstances may require for a given application. Such an optical system may, for example, include a conventional Cassegrain optical system and/or moveable mirrors for changing the direction of the beam as is suggested in the drawing. Thus, as shown in the drawing, the optical system 11 may be manually or automatically controllable to direct to a workpiece the laser beam 13 emerging therefrom, for example, during one phase of the operational cycle and in another phase of the operational cycle, direct the laser beam 13 to absorption apparatus more fully described herein below when it is desired for example to operate the laser for test purposes, change workpieces or workpiece position and the like.

Absorbing apparatus in accordance with the invention may comprise as shown in the drawing a mirror 14 pivotal about an axis 15 for receiving the laser beam 13 and directing it preferably downwardly into a container 16 containing comminuted or granular refractory material 17 having a high melting point such as sand or a refractory material that functions as an inert diffuse scatterer of an incident laser beam.

If the mirror 14 is pivotally moveable about an axis 15 disposed normal to the direction of the laser beam, it permits the laser beam to be directed vertically downwardly into the container 16. The laser beam may be defocused in any one of a number of ways. Thus, suitable conventional defocusing optics may be provided in the optical system 11 and mirror 14 oriented about its axis 15 and located at an appropriate position and distance from the optical system 11 and/or focal point of the laser beam and container 16 to direct the laser beam 13 into the container 16 with the desired degree of divergence or cross-sectional area. Alternately, the mirror 14 may be convex in shape to provide and/or contribute the defocusing of the laser beam.

The container 16 is partially filled as to a depth of several inches with comminuted material 17 having a high melting point such as sand or comminuted sand-like or granular refractory material that will function as an inert diffuse scatterer of a laser beam incident thereon such as that obtained from a $CO_2$ laser.

While sand is preferred because of its ready availability, low cost and absorption characteristics, other materials having a high melting temperature such as ground-up or granular refractory materials may also be used so long as when exposed to the laser radiation, it converts incident laser radiation, or at least a substantial fraction of this radiation to non-coherent Black Body radiation. For very large laser beam energy densities, it is possible to vaporize the material 17 and produce smoke and fumes. This is simply avoided by providing an adequately sized container and by controlling beam cross-sectional area or defocusing the beam such that irrespective of its power, upon impingement on the material, the energy density of the beam is insufficient to cause undesirable effects such as vaporizing the material.

Where energy levels require, coolant pipes 18 may be provided in the bottom of container 16. Normally, the low heat conduction of suitable materials such as sand and the like prevents a significant amount of heat transfer into the material.

It has been found in actual practice that when the comminuted or granular material such as sand is exposed to high power laser radiation, it heats up and emits Black Body radiation, the low conductivity of the sand preventing a significant amount of heat transfer into the sand.

By proper selection of the comminuted or granular material and defocusing of the laser beam, the comminuted material may be caused to function in principle like a stove and radiate non-coherently with a power essentially equal to the incident laser beam power.

FIG. 2 illustrates by way of example various ways and arrangements for utilizing the invention. Thus, there is shown in FIG. 2 a high power laser source 20 providing a focused (divergent) output laser beam 21. Disposed in the path of and receiving the laser beam 21 is a primary or first optical system 22 of any suitable conventional design and configuration for the purpose of, for example, receiving the laser beam as it emerges from the laser source for the purpose of processing it and permitting it to be shaped, directed and the like as may be required. A second or secondary optical system 23 is shown disposed for receiving the laser beam 24 exiting from the primary optical system 22. The laser beam 25 exiting from the secondary optical system 23, in a form, configuration and conditon as may be suitable or desired, for example, for welding, cutting or heat treating a metal workpiece, is directed to a workpiece 26. Disposed along the axis of the beam 25 is a mirror 27 and bed of material 28 as and for the purposes shown and discussed in connection with FIG. 1. Any portion of the laser beam not intercepted by a workpiece is safely and efficiently directed into the bed of material 28.

Disposed between the laser source 20 and the primary optics system 22 is a mirror 30 selectably movable into and out of a position which intersects beam 21, as by a solenoid 31. When actuated to its position to intercept beam 21, the mirror reflects the entire beam into another bed of material 32. Provision of means for absorbing the laser beam 21 is advantageous for a number of purposes, i.e., changing workpieces, starting up or shutting down the laser source, conducting tests on or with laser source for purposes of maintenance and the like, etc.

Disposed between the optical systems 22 and 23 is a mirror 35 adapted to function as a spacial filter or mask 35 suitable, for example, to shape and/or attenuate the beam 24. For this purpose the mirror 35 (as with mirrors 27 and 30) is spaced from the beam focal point and provided with an aperture through which the laser beam passes. The aperture is of the size and configuration to provide the desired effect on the laser beam. The mirror 35 directs the intercepted portion of the laser beam 24 in a further bed of material 36.

The provision of a mirror 35 and the bed of material 36 is particularly advantageous in shaping, attenuating, etc. a high power laser beam. In such situations, the periphery of the aperture of a spacial filter or mask is subject to substantial if not destructive thermal effects and particular care must be taken to provide adequate cooling of the mask and especially heat removal from the periphery of the aperture in the mask. Since quite often the diameter of the aperture is relatively small and the heat flux can be very high, it will be appreciated that provision of adequate cooling is a simple and straightforward matter and in any event introduces substantial cost into the manufacture of an industrial system.

A mirror 35 and bed of material 36 substantially reduce if not eliminate the prior art problems referred to above. Thus, the portion of the laser beam incident on the mirror 35 is not absorbed, but simply, efficiently and safely reflected into the bed of material 36. Further if all of the power incident on mirror is not reflected, only such a small amount will be absorbed that it can be easily and economically removed.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the apirit and scope of the invention as defined by the following claims.

I claim:
1. In the method of operating high power lasers, the steps comprising:
   a. providing a bed of loose granular refractory material having a surface that is a diffuse scatterer of light energy and that emits substantially only Black Body radiation when heated to radiating temperatures by a laser beam;
   b. generating a laser beam of sufficient power that when focused to substantially a spot on said material, said beam will vaporize said material;
   c. directing at least a part of said laser beam in a first direction to impinge on a mirror, said mirror directing said laser beam in a vertically downward second direction to impinge on said material; and
   d. causing said laser beam at said material to have a beam intensity insufficient to substantially vaporize said material.

2. The method as defined in claim 1 wherein said material is sand.

3. The method as defined in claim 1 wherein said beam is caused to divergently impinge on said material.

4. The method as defined in claim 3 wherein the length of said first and second directions and the divergence of said laser beam are selected to provide said beam intensity at said material.

5. In the method of operating high power lasers, the steps comprising:
   a. providing a bed of loose granular refractory material having a surface that is a diffuse scatterer of light energy and that emits substantially only Black Body radiation when heated to rediating temperatures by a laser beam;
   b. generating a laser beam of sufficient power that when focused to substantially a spot on said material, said beam will vaporize said material;
   c. directing said laser beam in a first direction through an aperture in a mirror, said mirror directing that portion of said laser beam impinging on it in a vertically downward second direction to impinge on said material; and
   d. causing said laser beam at said material to have a beam intensity insufficient to substantially vaporize said material.

6. In the method of operating high power lasers, the steps comprising:
   a. providing a bed of loose granular refractory material having a surface that is a diffuse scatterer of light energy and that emits substantially only Black Body radiation when heated to radiating temperatures by a laser beam;
   b. generating a continuous laser beam of sufficient power that when focused to substantially a spot on said material, said beam will vaporize said material;
   c. directing said laser beam in a first direction to impinge on a workpiece when it is desired to process said workpiece with said beam;
   d. selectively disposing a mirror to intercept said beam and prevent it from impinging on a workpiece;
   e. causing said beam when incident on said mirror to impinge on said material; and
   f. controlling the cross-sectional area of said beam whereby upon impingement on said material said beam has an intensity insufficient to substantially vaporize said material.

7. In the method of operating high power lasers, the steps comprising:
a. providing a bed of loose granular refractory material having a surface that is a diffuse scatterer of light energy and that emits substantially only Black Body radiation when heated to radiating temperatures by a laser beam;
b. generating a continuous laser beam of sufficient power that when focused to substantially a spot on said material, said beam will vaporize said material;
c. directing said laser beam in a first direction on a workpiece when it is desired to process said workpiece with said beam and in a second direction to impinge on a mirror when it is desired to remove said laser beam from said workpiece;
d. causing said beam when incident on said mirror to impinge on said material; and
e. controlling the cross-sectional area of said beam whereby upon impingement on said material said beam has an intensity insufficient to substantially vaporize said material.

8. Apparatus for absorbing a high power laser beam having a source for generating said laser beam and means for absorbing excess beam energy, the improvement in said means comprising:
a. a bed of comminuted refractory material having a surface that is a diffuse scatterer of light energy and that emits substantially only Black Body radiation when heated to radiating temperatures by a laser beam;
b. mirror means for receiving at least a portion of a high power laser beam from a first direction and directing said beam in a vertically downward second direction to impinge on said material; and
c. optical means for controlling the cross-sectional area of said beam at said material to provide a beam intensity insufficient to substantially vaporize said material.

9. Apparatus as defined in claim 7 wherein said material is sand.

10. Apparatus as defined in claim 8 wherein the form of said beam in said second direction is divergent.

11. Apparatus as defined in claim 8 wherein said bed of material, mirror means and optical means are spaced a distance one from another to provide said beam intensity at said material.

12. High power laser apparatus for processing a workpiece with a high power laser beam comprising:
a. means for generating a continuous laser beam of sufficient power that when focused to substantially a spot on sand, said beam will vaporize said sand;
b. a bed of sand; and
c. mirror means comprising a mirror having an aperture for receiving and through which less than all of said laser beam passes, said mirror means directing the intercepted portion of said beam on said sand as a defocused beam with an intensity insufficient to substantially vaporize said sand.

* * * * *